March 9, 1926.　　　　　　　　　　　　　1,576,321
C. B. GASSER
MECHANISM FOR FRYING POTATO CHIPS AND THE LIKE
Filed Sept. 22, 1923　　　2 Sheets-Sheet 1

Inventor.
Charles B. Gasser

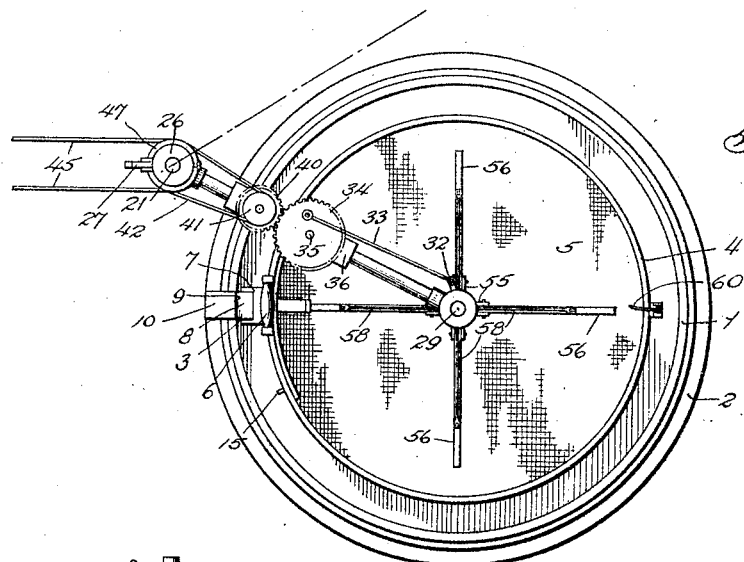

Patented Mar. 9, 1926.

1,576,321

UNITED STATES PATENT OFFICE.

CHARLES B. GASSER, OF READING, PENNSYLVANIA.

MECHANISM FOR FRYING POTATO CHIPS AND THE LIKE.

Application filed September 22, 1923. Serial No. 664,182.

*To all whom it may concern:*

Be it known that I, CHARLES B. GASSER, a citizen of the United States, residing at Reading, in the county of Berks and State of Pennsylvania, have invented certain new and useful Improvements in Mechanism for Frying Potato Chips and the like, of which the following is a specification.

The primary object of this invention is to provide a device whereby potato chips, doughnuts or the like may be fried in large quantities with a minimum of effort on the part of the operator, and in which mechanical means are provided for stirring the potato chips while undergoing the cooking operation.

With this and other objects in view as will be hereinafter more fully pointed out, reference will be had to the accompanying drawing forming a part of this specification and in which:—

Fig. 2 is a top plan view, of the parts in cooking position,

Fig. 3 is a view similar to Fig. 1 with the parts in cooking position,

Figure 1:
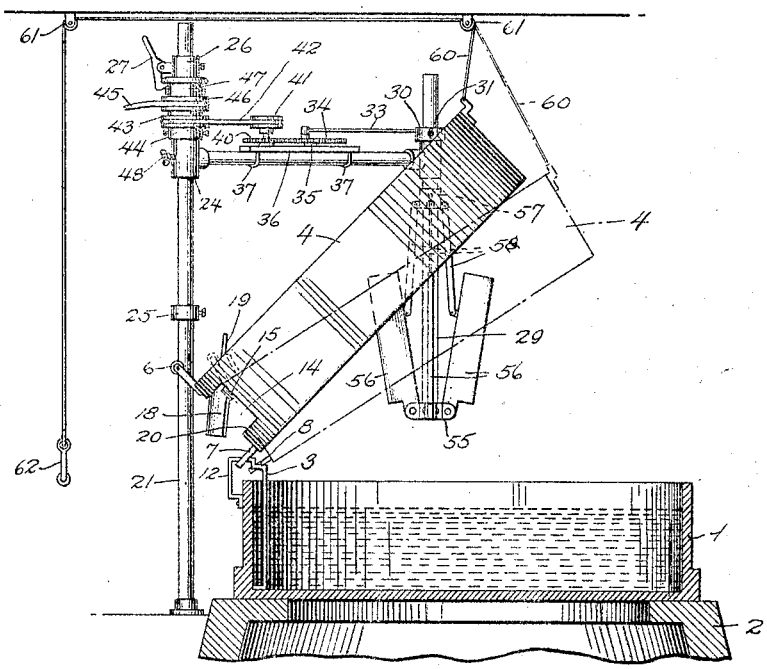
Fig. 1 is a view in side elevation, partly in section, with basket fully raised and intermediate drip position indicated, the stirrer blades being shown closed and swung away.
Figure 4:
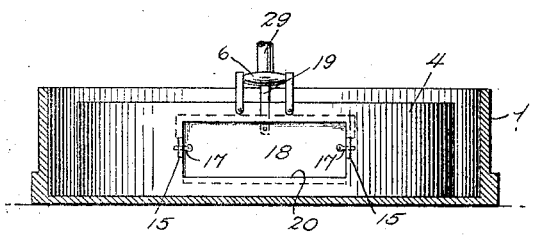
Fig. 4 is a vertical sectional view illustrating certain details.
Figures 5, 6:
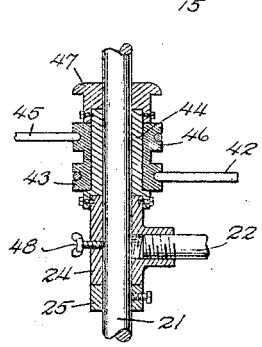
Figs. 5 and 6 are detail views.

Referring to the drawings, reference numeral 1 indicates the kettle which contains the frying fat, and which is illustrated as resting upon the top of a stove 2. This kettle is circular in cross section and is provided with a supporting bar 3 for the chip basket 4, the latter also being circular in cross section and adapted to fit freely into the kettle. The basket is provided with a perforated or sieve bottom 5 and with a handle 6 extending upwardly from a point in the side wall, and adjacent this point and near its bottom, the basket is further provided with an apertured supporting arm 7. Through the aperture of this arm 7, passes the supporting bar 3 of the kettle. This bar 3, it will be observed, is attached to the bottom of the kettle, extends upwardly therefrom parallel with the side wall of the kettle and in spaced relation thereto, and at a point above the plane of the upper edge of the kettle side wall, the said bar 3 is bent at right angles to provide a substantially horizontal rest portion 8. The bar 3 is then bent upwardly substantially at right angles to the rest portion 8 to provide a shoulder 9, and again it is bent substantially at right angles producing horizontal portion 10, which continues into an angular portion 12 which is attached suitably to the upper portion of the side wall of the kettle. Adjacent the point where the handle 6 and supporting arm 7 attach with the chip basket, said basket is provided with a discharge opening 14, and on each side of this opening is provided an ear 15 having vertical slots 16 that receive the pintles 17 of a closure 18, said closure having the same curvature as the side wall of the chip basket. This closure is provided with an operating handle extension 19 by means of which the closure may be lifted to bring its lower edge to clear the upper edge 20 of the lower wall of the discharge opening to permit said closure being swung by said handle 19 to open position.

Extending upwardly from a suitable support adjacent the stove 2, is a post 21. This support may be the floor, a table, bracket, or the like, and the upper end of the post may be steadied by a connection with the ceiling if desired, though not adopted in the drawing. An arm 22 provided with a T-shaped terminal member 24 bored to receive said post 21 is mounted for vertical sliding and horizontal swinging movement on said post 21. In its lowest position, said arm is arrested by an adjustable stop 25 on said post, and in its highest position, the arm is arrested by a similar stop 26, preferably provided with a latch 27 whereby said arm 22 and its supported parts may be retained in the elevated position, when so desired. At its outer end, said arm 22 is provided with another terminal T-shaped member 28 perforated to receive a vertical stirrer shaft 29. This shaft may be vertically adjusted by means of a collar 30 and set screw 31, said set screw engaging with the said shaft 29 and the collar resting on top of said T-shaped terminal member 28. This collar 30 is also provided with a crank arm 32 to which a pitman 33 connects at one end and at its other end, said pitman connects with a crank gear 34 pivoted at 35 to a plate 36 which is attached to said arm 22 by clip bolts 37. The crank gear 34 may be rotated in various manners, but the belt gearing illustrated has been elected for the purpose of this application, and includes a gear 40 and its pulley 41 suitably journaled on said plate 36 and a belt 42 running around said pulley and another pulley 43 journaled on, or attached on, if preferred, an integral tubular extension 44 of said T-shaped terminal member 24. Power is taken from a somewhat distant electric motor (not shown) by means of a belt 45 passing around a pulley 46 which may be integral with or attached to the adjacent pulley 43. The pulleys 43 and 46 are replaceably held in said tubular extension 44 by means of a removable cap or collar 47, and a set screw 48 passes through the T-head 24 into binding engagement with the post 21 to prevent undesired swinging of the arm due either to a blow or the like, or to the rotative influence of the pulleys 43 and 46.

To a spider 55 secured to the lower end of the stirrer shaft 29, are pivoted the inner ends of radiating stirrer paddles 56. A runner 57 is also provided on the stirrer shaft 29 and pivoted to it and to the outer portions of the upper edges of the paddles are links or stretchers 58. This construction permits the stirrer to be folded from the Fig. 3 to the Fig. 1 position and vice versa.

To the chip basket, at a point opposite the supporting arm 7, is attached a cord 60 which passes through pulleys 61 and terminates in a handle or counterweight 62.

In operation, the basket 4 containing the potato chips, doughnuts, or the like, is lowered to the cooking position illustrated in Fig. 3, and the stirrer lowered into the basket with its blades 56 unfolded, the closure 18 being closed. As the cooking proceeds, the motor (not shown) is started, though throughout the cooking, discharging and charging operations, it is not necessary to stop and start this motor for each operation, as these steps can be performed with the motor continuously rotating. From this motor, the belt 45 drives the pulleys 46 and 43 and from the latter, the belt 42 drives pulley 41 and gear 40. The latter meshing with crank gear 34 rotates same, and its crank actuates pitman 33 and through the latter crank 32 is moved, thereby oscillating the stirrer shaft 29 and its blades 56. This oscillation is not disturbed by the folding or unfolding of the stirrer blades or the swinging of the arm 22 on the post 21 which takes place when the attendant terminates the cooking step by loosening set screw 48 and manually elevating the arm 22, where it will be retained by latch 27, and also swinging the arm to bring the stirrer out of the vertical plane of the kettle 1 and basket 4. To reduce the space required for this movement, the stirrer is previously folded in the manner of an umbrella. The stirrer parts will now be in the Fig. 1 position. The attendant now grasps the handles 6 and 62 and by proper manipulation elevates the basket 4 to a position above the fat in the kettle 1, which is the dotted line or draining position of Fig. 1. In this position, the arm 7 is engaged with the rest portion 8, and the basket is held thereby until the completion of the draining operation, when the attendant again takes hold of the handles 6 and 62 and brings the basket to the discharging or full line position of Fig. 1. In this position the arm 7 is engaged with the rest portion 10, and here it will be stated that the portion 8 must necessarily bear an angular relation to the portion 10 to cause the basket to incline differently in the draining position than when in the discharging position. The attendant now grasps the handle 19 and draws upwardly on the same, thereby sliding the pivots 17 in the slots 16 and elevating the closure to a point where its lower end will clear the edge 20 of the discharge opening of the basket, at which time, said closure 19 may be swung to the open position illustrated in full lines in Fig. 1, the inclination of the basket causing the contents to move by gravity out of the basket. A receiving receptacle (not shown) may be located adjacent the stove in position to receive the discharged contents. When the closure 19 is again closed, the articles to be cooked are filled into the basket, a suitable position therefor being the discharging or draining position, though preferably the latter. The weight or handle 62 is then elevated manually and the handle 6 also grasped, permitting and guiding the basket into the submerged cooking position of Fig. 3, and while in this position, the stirrer after release by the latch 27, is swung into the plane of and lowered into the basket 4 and rotated therein as previously described.

What is claimed is:—

1. A cooking apparatus including a fat kettle and a basket therein for containing the articles to be cooked, means for raising and supporting the body above the kettle in a position to permit draining, and means for preventing one side of the basket elevating beyond a predetermined position during the raising of the basket out of the kettle to cause the basket to tip into a position in which the contents will discharge by gravity.

2. A cooking apparatus including a fat kettle, and a basket therein for containing the articles to be cooked, a perforated extension on the basket, a rod on the kettle passing through said perforation and having separate supporting portions for supporting the basket out of the fat in different positions, one of said positions being at an inclination to cause discharge of the contents by gravity.

3. A cooking apparatus, including a fat kettle, and a basket therein for containing the articles to be cooked, a perforated extension on the basket, a substantially vertical rod on the kettle passing through said perforation, said rod having substantially horizontal portions arranged at different elevations for supporting the basket in different positions, one of which positions is at an inclination to cause discharge of the basket contents by gravity.

4. A cooking apparatus, including a fat kettle, and a basket therein for containing the articles to be cooked, a perforated extension on the basket, a substantially vertical rod on the kettle spaced from the side wall thereof, said rod having a step formation at its upper portions for supporting the basket in different position, one of which positions is at an inclination to cause discharge of the basket contents by gravity.

5. In a device of the character described, a receptacle having an opening in its side wall, a retaining element adjacent the lower edge of said opening, a pivoted closure arranged within said receptacle and located interiorly of said retaining element, and means whereby said closure may be moved to clear said retaining element and swing outwardly through said opening.

6. In a device of the character described, a receptacle having an opening in its side wall, a retaining element adjacent the lower edge of said opening, a closure, normally located interiorly of said retaining element, pivots on said closure adjacent its upper portion, slotted bearings on said receptacle adjacent the upper portion of said opening and receiving the said pivots in their slots, and a hand grip for raising said closure to clear said retaining element and to be swung outwardly through said opening.

7. In a device of the character described, a receptacle having an opening in its side wall, a retaining element adjacent the lower edge of said opening, a pivoted closure arranged within said receptacle and located interiorly of said retaining element, means whereby said closure may be moved to clear said retaining element, and means for inclining said receptacle to cause said closure to swing outwardly through said opening when clear of said retaining element.

8. A cooking apparatus, including a fat kettle, and a basket therein for containing the articles to be cooked, means for supporting the basket out of the fat in a position in which the contents will discharge by gravity, said basket having an opening in its side wall, a retaining element adjacent the lower edge of said opening, a pivoted closure arranged within said basket and located interiorly of said retaining element, means whereby said closure may be moved to clear said retaining element to permit the closure to swing outwardly through said opening when the basket is in inclined discharging position.

In testimony whereof I affix my signature.

CHARLES B. GASSER.